United States Patent [19]

Rolando et al.

[11] Patent Number: 5,326,823

[45] Date of Patent: Jul. 5, 1994

[54] POLYFLUOROPOLYETHER GRAFT COPOLYMERS

[75] Inventors: Richard J. Rolando; Anthony B. Clinch, both of Oakdale, Minn.

[73] Assignee: Minnesota Mining and Manufacturing Company, St. Paul, Minn.

[21] Appl. No.: 81,803

[22] Filed: Jun. 23, 1993

Related U.S. Application Data

[63] Continuation of Ser. No. 665,264, Mar. 6, 1991, abandoned.

[51] Int. Cl.⁵ ............... C08F 255/00; C08F 263/04; C08F 265/04
[52] U.S. Cl. ............... 525/276; 525/297; 525/298; 525/302; 525/308; 525/312; 525/320; 525/322; 525/324
[58] Field of Search ............... 525/276, 297, 298, 302, 525/308, 312, 320, 322, 324

[56] References Cited

U.S. PATENT DOCUMENTS

| | | |
|---|---|---|
| 2,642,416 | 6/1953 | Ahlbrecht et al. . |
| 2,803,615 | 8/1957 | Ahlbrecht et al. . |
| 2,841,573 | 7/1958 | Ahlbrecht et al. . |
| 3,102,103 | 8/1963 | Ahlbrecht . |
| 3,177,270 | 4/1965 | Jones et al. . |
| 3,250,807 | 5/1966 | Fritz et al. . |
| 3,282,905 | 11/1966 | Fasick et al. . |
| 3,304,278 | 2/1967 | Hauptschein et al. . |
| 3,378,609 | 4/1968 | Fasick et al. . |
| 3,384,627 | 5/1968 | Anello et al. . |
| 3,386,977 | 6/1968 | Kleiner . |
| 3,392,046 | 7/1968 | Marder . |
| 3,394,116 | 7/1968 | Sorkin . |
| 3,407,183 | 10/1968 | Farah et al. . |
| 3,442,942 | 5/1969 | Sianesi et al. . |
| 3,450,611 | 6/1969 | Loffelhosz et al. . |
| 3,451,907 | 6/1969 | Sianesi et al. . |
| 3,514,420 | 5/1970 | Katsushima et al. . |
| 3,532,659 | 10/1970 | Hager et al. . |
| 3,544,663 | 12/1970 | Hauptschein et al. . |
| 3,546,187 | 12/1970 | Tandy . |
| 3,547,861 | 12/1970 | Anello et al. . |
| 3,574,791 | 4/1971 | Sherman . |
| 3,578,487 | 5/1971 | Knell et al. . |
| 3,699,145 | 10/1972 | Sianesi et al. . |
| 3,715,378 | 2/1973 | Sianesi et al. . |
| 3,810,874 | 5/1974 | Mitsch et al. . |
| 3,864,318 | 2/1975 | Caporiccio et al. . |
| 3,870,767 | 3/1975 | Grimaud et al. . |
| 3,876,729 | 4/1975 | Mueller ................ 525/276 |
| 3,896,167 | 7/1975 | Sianesi et al. . |
| 4,003,874 | 1/1977 | Ide et al. . |
| 4,015,612 | 4/1977 | Paulik et al. . |
| 4,080,319 | 3/1978 | Caporiccio et al. . |
| 4,085,137 | 4/1978 | Mitsch et al. . |
| 4,094,911 | 6/1978 | Mitsch et al. . |
| 4,100,225 | 7/1978 | Mueller . |
| 4,146,529 | 3/1979 | Yamamoto et al. . |

(List continued on next page.)

FOREIGN PATENT DOCUMENTS 0393230 10/1990 European Pat. Off. .
1393693 5/1975 United Kingdom .

OTHER PUBLICATIONS

Plastics Compounding, Jan./Feb. 1986, pp. 44–53, (Eise et al.).
Plastics Compounding, Sep./Oct. 1986, pp. 24–39, (Frund et al.).
Reactive Modifiers for Polymers, Polymer Prep., 1986, 27, 89, (Al-Malaika).

*Primary Examiner*—Vasu S. Jagannathan
*Attorney, Agent, or Firm*—Gary L. Griswold; Walter N. Kirn; Carole Truesdale

[57] ABSTRACT

A fluorochemical graft copolymer comprising: a base polymer comprising polymerized units derived from monomers having terminal olefinic double bonds, having grafted thereto a plurality of polyfluoropolyether groups, Also disclosed is a process for preparing such a graft copolymer, and a method for reducing the surface energy of a polymer comprising polymerized units derived from monomers having terminal olefinic double bonds.

14 Claims, 1 Drawing Sheet

U.S. PATENT DOCUMENTS

| | | |
|---|---|---|
| 4,228,255 | 10/1980 | Fujimoto et al. . |
| 4,321,404 | 3/1982 | Williams et al. . |
| 4,404,247 | 9/1983 | Burguette et al. . |
| 4,472,480 | 9/1984 | Olson . |
| 4,565,714 | 1/1986 | Koshar . |
| 4,567,073 | 1/1986 | Larson et al. ............... 428/511 |
| 4,569,962 | 2/1986 | Burguette et al. . |
| 4,590,236 | 5/1986 | Konig et al. . |
| 4,647,413 | 3/1987 | Savu . |
| 4,666,991 | 5/1987 | Matsui et al. . |
| 4,743,300 | 5/1988 | Brinduse et al. . |
| 4,830,910 | 5/1989 | Larson . |
| 4,841,090 | 6/1989 | Patel . |
| 4,857,254 | 8/1989 | Wong et al. . |
| 4,950,549 | 8/1990 | Rolando et al. . |
| 4,988,771 | 1/1991 | Takeuchi et al. . |
| 5,213,743 | 5/1993 | Ohara et al. . |

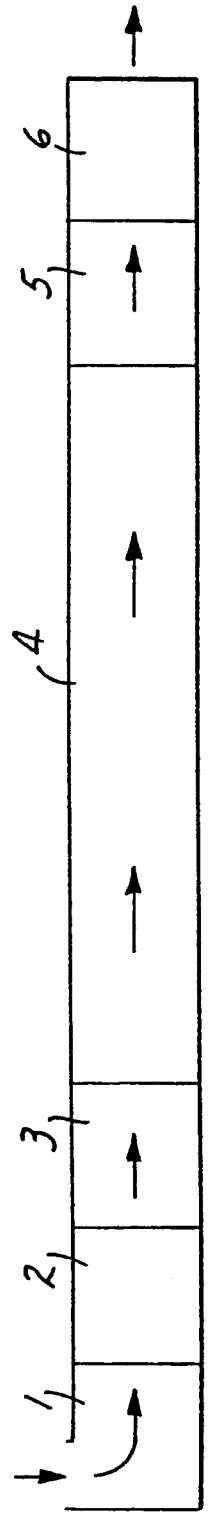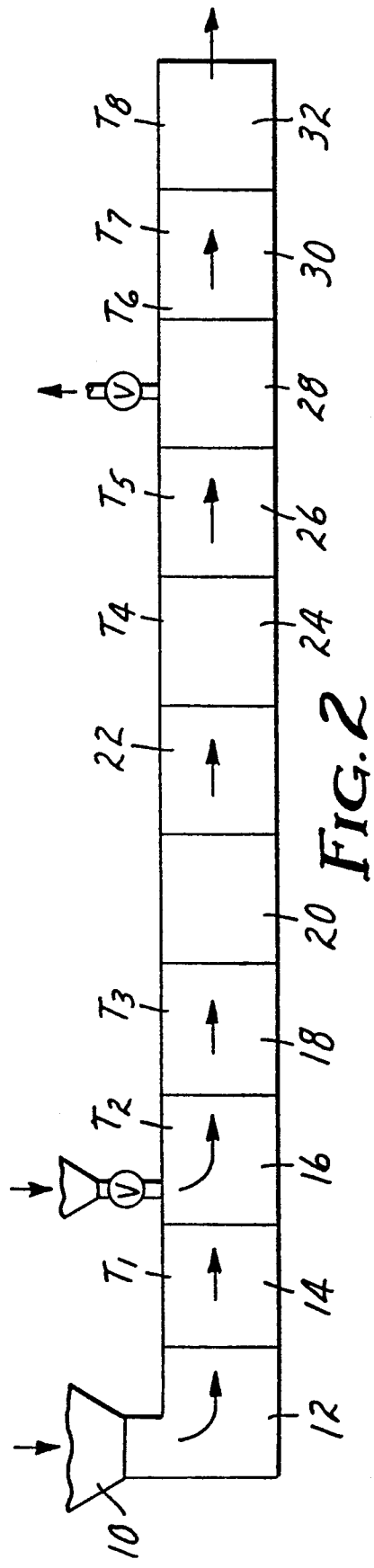

POLYFLUOROPOLYETHER GRAFT COPOLYMERS

This is a continuation of application Ser. No. 07/665,264 filed Mar. 6, 1991, abandoned.

BACKGROUND OF THE INVENTION

1. Field of the Invention

This invention relates to continuous processes using wiped-surface reactors for free radical graft polymerization of polyolefins, and to graft copolymers thereby produced. In another aspect, this invention relates to polyfluoropolyethers and copolymers thereof. In yet another aspect, this invention relates to polyfluoropolyether peroxides.

2. Description of the Related Art

Processing and/or production of polymeric resins using wiped-surface reactors such as screw extruders and twin-screw extruders is well known (such processing is often called reactive extrusion). Twin-screw extruders and their use in continuous processes such as graft polymerization, alloying, bulk polymerization of vinyl monomers, and condensation and addition reactions are generally described in *Plastics Compounding,* Jan./Feb. 1986, pp. 44–53 (Else et al) and *Plastics Compounding,* Sept./Oct. 1986, pp. 24–39 (Frund et al.). Graft reactions are said to be carried out by first melting a polymeric species in the initial stages of an extruder, injecting a peroxide catalyst into the extruder, and mixing in a monomer under high shear conditions. Advantages of the twin-screw extrusion process are said to include narrow distribution of molecular weight, improved melt-flow properties, consistent process control, and continuous processing.

Graft polymerization reactions of polyolefins with various monomers using wiped-surface reactors are known. Such grafting is said to be useful in providing a polymer adduct with functionality to allow further modification of structure and properties. General mechanistic proposals regarding formation of these "mechanochemically synthesized" adducts are discussed in connection with grafting of maleic anhydride onto polypropylene in *Polymer Prep.,* 1986, 27, 89 (Al-Malaika).

A number of particular free radical graft polymerization reactions have been reported. For example, U.S. Pat. No. 3,177,270 (Jones et al.) discloses a process for preparing graft copolymers by mixing an olefin polymer at a temperature between 110° C. and 250° C. while contacting the polymer with a minor proportion of a mixture comprising a monovinyl aromatic compound and optionally one or more other monomers such as acrylic acid, methacrylic acid, acrylonitrile, methyl methacrylate, methacrylonitrile, or maleic anhydride, the mixture having dissolved therein an organic peroxide.

British Pat. No. 1,292,693 (Steinkamp et al.) discloses use of a single-screw extruder to graft monomers such as maleic anhydride and acrylic acid onto polyolefins such as polypropylene in the presence of a suitable free radical initiator such as an organic peroxide. The product graft copolymers are said to have a melt flow rate (MFR) of at least 50% greater than the MFR of the base polymer.

U.S. Pat No. 4,003,874 (Ide et al.) discloses modified polyolefins obtained by adding an unsaturated carboxylic acid or an anhydride thereof and an organic peroxide to a polyolefin and melting these components in an extruder. The polyolefin so obtained is said to adhere to glass fibers.

U.S. Pat. No. 4,146,529 (Yamamoto et al.) discloses a process for production of modified polyolefins by combining a polyolefin with one or more carboxylic acids or their anhydrides in an extruder in the presence of a radical producing agent and an organosilane.

U.S. Pat. No. 4,228,255 (Fujimoto et al.) discloses a method for crosslinking a polyolefin, the polyolefin being a low density polyethylene or a polyolefin mixture containing a low density polyethylene, comprising reacting the polyolefin with an organic silane and an organic free radical initiator to form a silane-grafted polyolefin, then mixing the silane-grafted polyolefin with a silanol condensation catalyst. The mixture is extruded with heating in a single-screw extruder to provide a crosslinked polyethylene.

U.S. Pat. No. 4,857,254 (Wong et al.) discloses a method of grafting styrene and maleic anhydride to molten hydrocarbons in the absence of an initiator.

Complex polyfluoropolyether peroxides can be made by photooxidations as described in U.S. Pat. No. 4,743,300 (Brinduse et al.). Also described therein are functional polyfluoropolyether derivatives such as polyfluoropolyether acrylates, and the free radical polymerization of such derivatives. The polymerized materials are said to have useful properties such as low coefficient of friction, high resistance to chemicals, high oxygen permeability, and thermal stability over a wide range of temperatures.

U.S. Pat. No. 4,085,137 (Mitsch et al.) discloses polyfunctional poly(perfluoroalkylene oxide) compounds, such as compounds of the formula

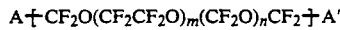

$$A\text{--}[CF_2O(CF_2CF_2O)_m(CF_2O)_nCF_2]\text{--}A'$$

where A and A' are reactive moieties containing a polymerizable functional group, e.g., a polymerizable double bond. Such compounds are said to be useful as monomers in the preparation of polymeric materials possessing unusual low temperature stability and resistance to solvents.

Also known are less complex polyfluoropolyether peroxides, prepared by the photochemical reaction of oxygen with: tetrafluoroethylene [U.S. Pat. No. 3,715,378 (Sianesi et al.)]; hexafluoropropylene [U.S. Pat. Nos. 3,699,145 and 3,896,167 (Sianesi et al.)]; mixtures of one or more perfluoroolefins [U.S. Pat. Nos. 3,442,942 (Sianesi et al.) and 3,450,611 (Loffelholz et al.)]; or perfluorodienes [U.S. Pat. No. 3,451,907 (Sianesi et al.)].

SUMMARY OF THE INVENTION

This invention provides a fluorochemical graft copolymer comprising: a base polymer comprising interpolymerized units derived from monomers having terminal olefinic double bonds, having grafted thereto a plurality of polyfluoropolyether groups. Preferred polyfluoropolyether groups have a backbone comprising at least two different perfluorooxyalkylene units selected from the group consisting of

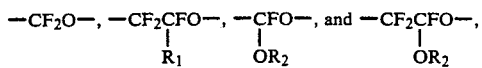

$$-CF_2O-,\ -CF_2CFO-,\ -CFO-,\ \text{and}\ -CF_2CFO-,$$
$$\phantom{-CF_2O-,\ -CF_2C}|\phantom{FO-,\ }|\phantom{CFO-,\ \text{and}\ -CF_2C}|$$
$$\phantom{-CF_2O-,\ -CF_2CF}R_1\phantom{O-,\ }OR_2\phantom{O-,\ \text{and}\ -CF_2CF}OR_2$$

wherein the perfluorooxyalkylene units are randomly distributed in the backbone, and wherein each $R_1$ is independently fluorine or straight chain, branched chain, or cyclic perfluoroalkyl of 1 to about 10 carbon atoms, each $R_2$ is independently straight chain, branched chain, or cyclic perfluoroalkyl of 1 to about 10 carbon atoms, optionally substituted with one or more substituents of the formula $-(R_3O)_n-R_4$ in which each $R_3$ is independently $-CF_2-$, $-CF_2CF_2-$, or $-CF_2(CF_3)CF-$, and each $R_4$ is independently straight chain, branched chain or cyclic perfluoroalkyl of 1 to about 10 carbon atoms, and n is an integer from 0 to about 6.

This invention also provides a process for preparing the fluorochemical graft copolymers of the invention, comprising the steps of:

(1) feeding to a reactor materials comprising:
   (a) a base polymer comprising polymerized units derived from monomers having terminal olefinic double bonds;
   (b) at least one free-radical initiator, and
   (c) a polyfluoropolyether monomer having a backbone comprising polyfluorooxyalkylene units, the monomer being terminated on at least one end with a functional group comprising a polymerizable double bond,
   wherein all materials are substantially free of oxygen;

(2) reacting the materials in the reactor to provide a fluorochemical graft copolymer comprising the base polymer with a plurality of polyfluoropolyether groups grafted thereto; and (3) withdrawing the fluorochemical graft copolymer from the reactor.

A further process of the invention comprises the steps of:

(1) feeding to a reactor materials comprising:
   (a) a base polymer comprising polymerized units derived from monomers having terminal olefinic double bonds; and
   (b) a peroxidic polyfluoropolyether; and optionally
   (c) a polyfluoropolyether monomer having a backbone comprising polyfluorooxyalkylene units, the monomer being terminated on at least one end with a functional group comprising a polymerizable double bond,
   wherein all materials are substantially free of oxygen;

This invention also provides a method for lowering the surface energy of a polymer comprising interpolymerized units derived from monomers having terminal olefinic double bonds, comprising the step of grafting polyfluoropolyether groups to said polymer.

The polyfluoropolyether graft copolymers of the invention have desirable thermoplastic properties. Furthermore, the graft copolymers of the invention have lower surface energy than the corresponding base polymers and therefore they find use as release surfaces. Other useful applications of these graft copolymers include those wherein oil repellency and solvent resistance are desirable.

BRIEF DESCRIPTION OF THE DRAWING

FIG. 1 is an exemplary flow diagram of the process of the invention. Ancillary equipment such as pumps and valves, and secondary process streams such as utility lines (e.g., cooling water) have been omitted.

FIG. 2 is a flow diagram of a counter-rotating twin screw extruder useful in this invention.

DETAILED DESCRIPTION OF THE INVENTION

In the instant specification and claims the term "polyfluoropolyether" is sometimes abbreviated as "PPE". Also, as used herein the term "monomer" designates a compound that contains a polymerizable double bond.

A graft copolymer of the invention comprises a base polymer having polyfluoropolyether moieties grafted thereto. The grafted PPE moieties are in some instances derived from a PPE monomer (i.e., a PPE comprising a polymerizable double bond). The grafting in these instances occurs through the polymerizable double bond. The double bond is of course not present in the product graft copolymer of the invention; rather in the grafting process the double bond becomes a saturated link between the base polymer and the PPE moiety. In the instant specification and claims, reference to a grafted PPE monomer or to a grafted PPE monomer unit designates such a saturated link and does not designate the presence of olefinic unsaturation in the grafted moiety as it is incorporated in the graft copolymer.

Suitable base polymers include polymers comprising polymerized units derived from monomers having terminal olefinic double bonds, such as polymethyl methacrylate, poly-4-methylpentene, polypropylene, polybutylene, polystyrene, polyethylene, and copolymers such as ethylene/vinyl acetate copolymer, ethylene butyl acrylate copolymer, and the like, and mixtures and blends thereof. Such polymers of virtually any molecular weight are suitable. Polymers with a wide range of melt index values (e.g., from about 0.1 to about 1500) are also suitable.

Polyfluoropolyether monomers that can be grafted to the base polymer include any polyfluoropolyether monomer comprising a backbone comprising polyfluorooxyalkylene units (which can be identical or different from one another) and at least one terminal polymerizable double bond. Monofunctional perfluoropolyether monomers such as those disclosed in U.S. Pat. Nos. 3,810,874 (Mitsch et al.), 4,080,319 (Caporiccio et al.), 4,321,404 (Williams et al.) and 4,830,910 (Larsen), the disclosures of each being incorporated herein by reference, are suitable. Also suitable are difunctional perfluoropolyether monomers such as those disclosed in U.S. Pat. Nos. 3,250,807 (Fritz et al.), 4,094,911 (Mitsch et al.), 4,321,404 (Williams et al.), 4,472,480 (Olson), 4,567,073 (Larsen et al.), 4,647,413 (Sabu), and 4,830,910 (Larsen et al.), the disclosures of each being incorporated herein by reference.

Preferred polyfluoropolyether monomers include the difunctional perfluoropolyether monomers disclosed in U.S. Pat. Nos. 4,085,137 (Mitsch et al.) and 4,743,300 (Brinduse, et al.), the disclosures of which are incorporated herein by reference. The backbones of the polyfluoropolyether groups in the monomers disclosed in these patents comprise at least two different perfluorooxyalkylene units selected from the group consisting of $-CF_2O-$,

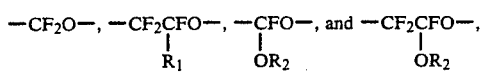

wherein the perfluorooxyalkylene units are randomly distributed in the backbone and wherein $R_1$ and $R_2$ are as defined above. Briefly described, the monomers disclosed in each of these patents are as follows: U.S. Pat. No. 4,085,137 (Mitsch et al.) discloses linear polyfunctional-terminated poly(perfluoroalkylene oxide) compounds of the formula

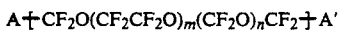

wherein A and A' are reactive radicals, preferably organic, bonded to a segment-terminating —CF$_2$—group (as shown) and containing a polymerizable group and wherein m and n designate the number of randomly distributed perfluoroethyleneoxy and perfluoromethyleneoxy backbone repeating subunits, respectively, the ratio m/n being 0.2/1 to 5/1, said compound having a number average molecular weight, $M_n$, in the range of 500 to 20,000 or higher, preferably 800 to 15,000.

While the segment-terminating groups are usually and preferably —CF$_2$—, segments containing —C$_2$F$_4$—, —C$_3$F$_6$—, or similar perfluoroalkylene radicals can be prepared and have essentially the same properties as do the —CF$_2$—terminated segments.

The backbone of the compounds of the formula above is terminated by perfluoromethylene groups bearing a polymerizable functional group directly bonded thereto or linked to said perfluoromethylene groups by polyvalent radicals free of non-aromatic double bonds.

U.S. Pat. No. 4,743,300 (Brinduse et al.) discloses polyfluoropolyethers represented by the formula

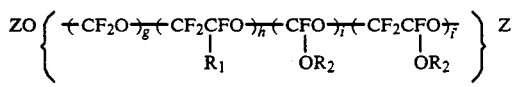

wherein
R$_1$ and R$_2$ are as defined above;
each Z is independently a polymerizable group which is or contains a polymerizable double bond;
g has a value of 1 or greater, e.g., up to about 2000;
h has a value of 1 or greater, e.g., up to about 2000;
the sum of i and i' has a value of 1 or greater, e.g., up to about 50;
the ratio g/h is less than 5;
the ratio (i+i')/(g+h) is 0.01 to 1.5;
the number average molecular weight of the polyfluoropolyether can be about 650 to 20,000.

Peroxidic polyfluoropolyethers that can be used in this invention include polyfluoropolyether peroxides prepared by the photochemical reaction of oxygen with: tetrafluoroethylene [U.S. Pat. No. 3,715,378 (Sianesi et al.)]; hexafluoropropylene [U.S. Pat. Nos. 3,699,145 and 3,896,167 (Sianesi et al.)]; mixtures of one or more perfluoroolefins [U.S. Pat. Nos. 3,442,942 (Sianesi et al.) and 3,450,611 (Loffelholz et al.)]; or perfluorodienes [U.S. Pat. No. 3,451,907 (Sianesi et al.)], the disclosure of each of the above being incorporated herein by reference.

U.S. Pat. No. 4,737,300 (Brinduse et al.) describes preferred peroxidic polyfluoropolyethers. These peroxidic Poly(perfluorooxyalkylene) compositions comprise a mixture of peroxidic poly(perfluorooxyalkylene) compounds, each compound comprising, or consisting essentially of, a backbone, or chain, of randomly distributed, perfluorooxyalkylene units represented by the formulas —CF$_2$O—,

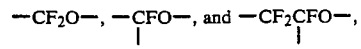

the depicted carbon and oxygen atoms of which are caternary backbone atoms, and —O—, which, when bonded to an —O—of any of the perfluorooxyalkylene units, forms a peroxy group, —O—O—, which imparts the peroxidic characteristics to the composition, and backbone-pendent perfluoroalkoxy groups or perfluoroalkoxy groups substituted with one or more ether oxygen atoms, the terminal ether oxygen atoms of which are bonded to carbon atoms of the

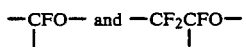

backbone units, and functional or non-functional groups, e.g., —COF or —CF$_3$, terminating said backbone. The compounds can have a wide range of number average molecular weights, e.g., 1000 to 1,000,000, or more, with the terminal groups having effect on composition properties at higher molecular weights.

As described in detail below such peroxidic polyfluoropolyethers can also be used as initiators in a process of the invention.

Preferably, a graft copolymer of the invention comprises about 0.1 percent to 20 percent, more preferably 0.5 percent to about 10 percent by weight of grafted polyfluoropolyether based on the weight of the base polymer.

The graft copolymers of the invention can be prepared by reacting the base polymer and a polyfluoropolyether monomer in the presence of a free radical initiator. Conventional initiators can be used, such as cumene hydroperoxide, t-butyl, and t-amyl hydroperoxides, and 2,5-dihydroperoxy-2,5-dimethylhexane; dialkyl peroxides such as di-t-butyl, dicumyl, and t-butyl cumyl peroxides, 2,5-dimethyl-2,5-di-(t-butylperoxy)-hex-3-yne; peroxyesters such as t-butyl perbenzonate and di-t-butyl-diperoxy phthalate, diacyl peroxides such as benzoyl peroxide and lauroyl peroxide; peroxyketals such as n-butyl-4,4-bis(t-butylperoxy-valerate and 1,1-di-t-butylperoxy-3,3,5-trimethylcyclohexane; and azo compounds such as azoisobutyronitrile. Such initiators can be used in any suitable amount, preferably about 0.1 percent to about 1 percent by weight based on the weight of the base polymer. Further, when the abovementioned types of initiators are used, the polyfluoropolyether monomer is preferably used in an amount substantially equal to the amount thereof that is intended to be incorporated into the graft copolymer of the invention.

It is preferred, however, to prepare the fluorochemical graft copolymers of the invention by reacting the base polymer with a peroxidic polyfluoropolyether as defined above. In such a process of the invention, the peroxidic polyfluoropolyether functions as the initiator and as the source of the groups that are grafted onto the base polymer. Peroxidic perfluoropolyether concentration in such a process is preferably about 0.1 percent to about 10 percent, more preferably about 1 percent to about 5 percent by weight based on the weight of the base polymer.

Alternatively, a peroxidic perfluoropolyether can be used as a conventional initiator (e.g., in an amount of about 0.1 percent to about 1 percent by weight based on the weight of the base polymer) in order to initiate the grafting of a perfluoropolyether monomer. In such a process, the perfluoropolyether monomer is used in an amount substantially equal to the amount of polyfluoropolyether that is intended to be incorporated into the graft copolymer of the invention.

Graft copolymers of this invention can be prepared using various well known reactors such as stirred tank reactors, tubular reactors, and extruders. Graft copolymers are preferably made by a process involving a wiped-surface reactor. A wiped surface reactor comprises a shell or vessel that contains at least one rotor having a wiping portion located close to the inside surface of the shell and a root portion that is spaced substantially further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during the operation of the reactor.

Intermeshing twin screw extruders can be used as wiped surface reactors. The screws function as the rotors and the flight lands function as the wiping portion, while the screw root surface between the flight lands functions as the root surface. Clearances between the inside of the barrel wall of the extruder and the flight lands of the screw are preferably in the range of about 0.25 to 0.5 mm. Although co-rotating twin screw extruders can be used, counter-rotating twin screw extruders are preferred. The counter-rotating extruder acts as a positive displacement pump conveying the reactant stream, and it also behaves as a series of small mixing zones or continuous stirred tank reactors. The counter-rotating twin screw extruder also gives good control over melting, mixing, and reaction temperatures.

Preferably, screws of a counter-rotating twin screw extruder are divided into segments, i.e., extruder screws can be composed of many separate screw segments that fit onto a common drive shaft by a keyway and can be disassembled and rearranged in various orders and configurations. It is also possible to use screw segments having multiple (e.g., two or three) starts and various pitch, and one or more screw segments can be reversed to increase mixing. Residence time of reactants, and thus properties of the resultant product, can therefore be varied by selection of screw pitch and/or screw speed (i.e., screw rpm). Furthermore, each particular zone of a twin screw extruder can be independently heated or cooled by external heating or cooling means, allowing further control of reaction conditions.

Use of a wiped surface reactor in the process of the invention is discussed with reference to FIG. 1. Base polymer can be fed in a region of the reactor coincident with the region in which the initiator is fed. For example, desired base polymer, preferably in pellet form, can be wetted with a free radical initiator and purged with an inert gas such as nitrogen, helium, argon or the like, to render the resultant material substantially free of oxygen; i.e., oxygen, if present, is present in an amount such that it does not significantly affect the desired free radical polymerization reactions. This material can be fed at a predetermined rate into feed zone 1 of the wiped surface reactor. It is preferred, however, to feed base polymer in a region of the reactor prior to the region in which the initiator is fed. Feed zone 1 typically comprises a feed throat, into which base polymer can be fed into the upstream end, and into which the initiator can be fed at the downstream end.

A further alternate method of feeding base polymer and initiator involves use of a two component feed zone consisting of a base polymer feed zone into which base polymer is fed, followed in sequence by a separate initiator feed zone into which initiator is fed. The extruder is preferably starve fed, i.e., all material fed into the feed zone is conveyed into initiation/melt zone 2 of the extruder, and nothing is held up in feed zone 1. Feed rates can vary with size of the reactor and for any given size of reactor, one skilled in the art will be able to determine suitable feed rates.

As an example, when a LEISTRITZ TM 34 mm counter-rotating twin screw extruder (Nuremberg, West Germany) is used, feed rates are preferably from about 0.4 Kg/h to about 9 Kg/h. The feed zone screw preferably has a high pitch (e.g., 20 mm) to accommodate base polymer pellets. The feed zone can, if desired, be operated in a temperature controlled manner, depending on the reactants, reaction conditions and the like. Generally, it is suitable to maintain the feed zone of the extruder in a temperature range from about 10° C. to about 50° C., depending on the base polymer used.

In initiation/melt zone 2, initiator and base polymer are mixed and heated to initiate radical chain reactions. Preferred temperatures will depend on the particular base polymer and initiator, but generally temperatures between 150° C. and about 250° C. are suitable.

When a polyfluoropolyether monomer is used, the monomer is purged with nitrogen and added to monomer addition zone 3, usually by a high pressure pump and under an inert atmosphere. PPE monomer is generally fed as a liquid or as a solution in an inert solvent (e.g., decane, toluene, tetrahydrofuran or the like). Preferred rates are variable, and when a LEISTRITZ TM 34 mm counter-rotating twin screw extruder is used, feed rate is preferably about 4 g/h to about 180 g/h. It is preferred to maintain monomer addition zone at a temperature of about 150° C. to about 250° C.

Grafting proceeds in reaction zone 4. The reaction zone is heated. As with the initiation/melt zone, the preferred temperature will depend on the particular base polymer and initiator system used. Further, the preferred temperature of the reaction zone will depend on the intended residence time in the reaction zone. Generally, temperatures between 150° C. to 250° C. and residence times in the range of 1 minute to 10 minutes are suitable.

In reactions where residual solvent remains, it is preferred to remove it from the grafted product by venting. This can be done in devolatization zone 5, where a vacuum (applied for example by means of a vacuum pump, not shown in the figures, providing a pressure of about 10 kPa absolute pressure) can be applied to a vent line. The resultant product is then passed through block zone 6, which conveys product graft copolymer for any further processing as desired, e.g., shaping in a die, quenching in a suitable quenching liquid, or pelletizing for convenience of handling and/or storage.

Graft copolymers of this invention can be fashioned in the form of a film or a coating. Such films or coatings are useful in applications where low surface energy, oil repellency, and/or solvent resistance are desirable. For example, when an adhesive tape is adhered to a film or coating of a graft copolymer of the invention in which polypropylene is the base polymer, the tape has lower adhesion properties than the same tape adhered to a polypropylene surface.

Objects and advantages of this invention are further illustrated by the following examples, but the particular materials and amounts thereof recited in these examples, as well as other conditions and details, should not be construed to unduly limit this invention.

EXAMPLES

Examples 1–11

These examples describe the graft copolymerization of polyfluoropolyether-peroxides (PPE-peroxides) with polypropylene using a BRABENDER TM compound mixer (C. W. Brabender Instruments, Inc., S. Hackensack, N.J.). PPE-peroxides used in these examples were prepared according to the general method described in U.S. Pat. No. 4,743,300 (Brinduse et al.) and have the general formula A $$GO\{(CF_2O)_n(C_2F_4O)_m(O)_p\}G \qquad (A)$$

wherein each end group G independently represents —COF, —OCF$_3$, —CF$_2$Cl, —C$_2$F$_4$Cl, or —CH$_2$COOH.

About 50 g of polypropylene resin base polymer (DYPRO TM 8771 pellets, melt index: 9; commercially available from FINA Co., Houston, TX) where added to a Brabender PLASTICORDER TM Mixer equipped with a 60 cc mixing head and melted at 180° C. Various concentrations of PPE-peroxide were added and mixed at 25 rpm for various times indicated in TABLE 1 below. The graft copolymer was then removed. The reaction conditions and particular PPE-peroxide used are set forth in TABLE 1, wherein A· is weight percent active oxygen, m/n is the ratio of randomly distributed (CF$_2$CF$_2$O)/(CF$_2$O) units in the PPE peroxide, and mw is number average molecular weight as measured by nuclear magnetic resonance.

TABLE 1

| Example | PPE peroxide $A_o$ | m/n | mw | PP (wt %) | PPE-peroxide (weight %) | Residence Time (min) |
|---|---|---|---|---|---|---|
| 1 | 0.05% | 0.79 | 25,000 | 91.1 | 8.9 | 5 |
| 2 | 0.05% | 0.79 | 25,000 | 91.1 | 8.9 | 15 |
| 3 | 0.05% | 0.79 | 25,000 | 91.1 | 8.9 | 25 |
| 4 | 0.29% | 0.98 | 25,000 | 90.7 | 9.3 | 5 |
| 5 | 0.29% | 0.98 | 25,000 | 90.7 | 9.3 | 15 |
| 6 | 0.29% | 0.98 | 25,000 | 90.7 | 9.3 | 25 |
| 7 | 0.54% | 0.88 | 44,000 | 90.9 | 9.1 | 5 |
| 8 | 0.54% | 0.88 | 44,000 | 90.9 | 9.1 | 15 |
| 9 | 0.54% | 0.88 | 44,000 | 90.9 | 9.1 | 25 |
| 10 | 0.54% | 0.88 | 44,000 | 82.3 | 16.8 | 15 |
| 11 | 0.54% | 0.88 | 44,000 | 82.3 | 16.8 | 25 |

Samples of these graft copolymers were prepared in the form of films with a thickness of about 0.13 mm by pressing at a pressure of 41.4 KPa for 30 seconds using a WABASH TM heated press (Wabash Co., Wabash, Ind.) about 10 g of the respective graft copolymer between aluminum plates at about 202° C. (395° F.). The pressed samples were quenched from the molten to the solid state in a room temperature water bath.

Grafting of polyfluoropolyether groups onto the base polymer was confirmed by extraction of the films in FREON TM 113 (E. I. DuPont de Nemours, Wilmington, Del.) in a conventional extraction apparatus until a stable weight loss was reached. TABLE 2 shows weight loss data for Examples 1–11 and a polypropylene control.

TABLE 2

| Example | % Wt Loss |
|---|---|
| PP Control | 3.64 |
| 1 | 0.00 |
| 2 | 2.38 |
| 3 | 4.29 |
| 4 | 4.55 |
| 5 | 4.11 |
| 6 | 5.08 |
| 7 | 3.14 |
| 8 | 5.24 |
| 9 | 1.37 |
| 10 | 2.51 |
| 11 | 2.99 |

The data in Table 2 show little difference between weight loss of the control and the Examples, indicating that polyfluoropolyether groups were grafted onto the polypropylene. NMR analysis of the extractant FREON TM 113 indicated the absence of PPE-peroxide.

Density measurements of these graft copolymers were done using a density gradient column. Results are shown in TABLE 3 below.

TABLE 3

| Example | Wt. % PPE-peroxide | Density (g/cm$^3$) |
|---|---|---|
| PP Control | 0. | 0.8880 |
| 1 | 8.9 | 0.9260 |
| 2 | 8.9 | 0.9243 |
| 3 | 8.9 | 0.9293 |
| 4 | 9.3 | 0.9430 |
| 5 | 9.3 | 0.9308 |
| 6 | 9.3 | 0.9320 |
| 7 | 9.1 | 0.9275 |
| 8 | 9.1 | 0.9310 |
| 9 | 9.1 | 0.9300 |
| 10 | 16.8 | >0.9580 |
| 11 | 16.8 | >0.9580 |

Examples 10 and 11, where more PPE-peroxide was used in the process, have greater density than Examples 1–9. Presuming that the number of polyfluoropolyether groups that are grafted onto the base polymer is proportional to the amount of PPE peroxide that is added during the preparation of the graft copolymer, the data in TABLE 3 indicate a density increase owing to incorporation of polyfluoropolyether groups.

EXAMPLES 12–14

These examples describe the graft copolymerization of a PPE-peroxide of the general formula A wherein A·=1.09%, m/n=1.01, and mw=37,000, to polypropylene using a twin screw extruder in a counter-rotating mode. Polypropylene resin (DYPRO TM 8771, melt index: 9, commercially available from FINA Co., Houston, Tex.) was mixed in a 5-gallon (19 L) shaker with 2.1 wt. % of the PPE-peroxide for 30 minutes. The PP/PPE-peroxide mixture was then purged with nitrogen for 30 minutes. The feed hopper and feed zone of the extruder were kept under nitrogen purge and polypropylene was fed with an augured feed into the feed zone of a 34 mm counter-rotating LEISTRITZ TM (LEISTRITZ Model LSM 30.34 GG, Nuremberg, West Germany) twin screw extruder (length to diameter (L/D)=35:1) configured as described below with reference to FIG. 2.

FIG. 2 shows a twin screw extruder with a feed hopper 10, feed zone 12, and a heated barrel that comprises: an initiation/melt zone comprising barrel section 14; a reaction zone comprising a monomer feed zone (barrel section 16 is not used in this example) and barrel sections 18, 20, 22, 24, and 26; a devolatilization zone comprising barrel section 28; and a block zone comprising barrel sections 30 and 32. Each barrel section is 120 mm long, and the extruder has total length of 1200 mm.

Transducer ports (e.g., T4 represents transducer number 4 located in barrel section 24) are located at 30 mm, and/or 90 mm into each heated barrel section. Thermocouple ports are located at 60 mm into each heated barrel section. Melt temperatures of 180° C., 200° C., and 50° C. were used. In heated barrel section 28 the extruder was vented under vacuum. The product graft copolymers were conveyed from the block zone (barrel sections 30 and 32), which was maintained at 180° C., into a water bath and fed into a pelletizer to afford generally cylindrical beads of 3 to 4 mm in length and a diameter of about 1 mm. Reaction conditions are summarized in TABLE 4.

TABLE 4

| Example | Melt Temp. (°C.) | Flow Rate (cc/min) |
|---|---|---|
| 12 | 180 | 62.7 |
| 13 | 200 | 70.3 |
| 14 | 250 | 62.2 |

Films of the graft copolymers of each of Examples 12-14 were made as described in Examples 1-11. 180° peel adhesion tests were run on these films and on an ungrafted polypropylene control film prepared in the same way, using an SCOTCH TM adhesive tape #8411 (3M) (acrylate-based pressure-sensitive adhesive tape with a 180° peel adhesion to glass of 110 g/cm).

180° Peel Adhesion Test

A 1.9 cm wide by 20.3 cm long strip of pressure-sensitive adhesive tape is adhered to a 10.1 cm wide, 15.2 cm long sheet of a test substrate (a pressed sample of a graft copolymer of the invention) with a free end of the tape extending beyond the end of the test substrate. The tape/substrate sample is rolled twice with a 1.35 Kg hard rubber roller to ensure contact between the adhesive and the test substrate. The free end of the tape is removed from the test substrate by pulling at 180° at a rate of 15.2 cm/minute using a Slip/Peel Tester (available from Instrumenters, Inc., Strongsville, Ohio).

The results are shown in TABLE 5 wherein each entry represents the average of five independent determinations.

TABLE 5

| Example | Peel Force (g/cm) |
|---|---|
| PP Control | 108 |
| 12 | 83 |
| 13 | 104 |
| 14 | 92 |

TABLE 5 indicates significantly reduced surface adhesion in the graft copolymers of Examples 12 and 14 when compared with the polypropylene control. The graft copolymer of Example 13 shows a smaller reduction of surface adhesion compared with the polypropylene control.

Examples 15-16

Graft copolymers were prepared as described in Examples 12-14 using the same polypropylene and a PPE-peroxide of general formula A wherein A·=0.28%.

A melt temperature of 200° C. was used. PPE-peroxide was added in the second zone of the extruder at 1 mL/min (Example 15) and 2 mL/min (Example 16) using a RUSKA TM positive displacement pump, and added in heated barrel section 16, 270 mm from start of the screw at the rates specified above. Total flow rate for each example was 27 g/min.

Films of the resulting graft copolymers were made as described in Examples 1-11 above.

Hexadecane contact angles were measured by the sessile drop method as described by A. W. Neumann and R. J. Good in "Techniques for Measuring Contact Angles," *Surface and Colloid Science*, 11, Plenum Press, N.Y., 1979 on these samples and a polypropylene control sample. Results are shown in TABLE 6.

TABLE 6

| Example | Contact Angle (°) |
|---|---|
| PP Control | 0 |
| 15 | 13 + 2 |
| 16 | 27 ± 2 |

The data in TABLE 6 indicate improved surface activity for Examples 15 and 16 compared to the polypropylene control.

Example 16 has a much greater hexadecane contact angle than Example 15, indicating the presence of a greater amount of grafted polyfluoropolyether in Example 16.

ESCA measurements were also done to confirm the presence of fluorine on the film surfaces. Fluorine to carbon (F:C) ratios for various samples are listed in TABLE 7. These measurements were done at various depths of the film to give some indication of the profile of fluorine incorporation.

TABLE 7

| | F:C Ratio Depth (nm) | | |
|---|---|---|---|
| Example | 100–250 | 400–600 | 800–900 |
| PP Control | 0 | | |
| 15 | 0.93 | 0.77 | 0.56 |
| 16 | 0.98 | 0.87 | 0.67 |

The data in TABLE 7 show that there is a significant amount of fluorine at the surface of these graft copolymers of the invention. Calculations of the expected F:C ratio of these graft copolymers based on the amount of PPE-peroxide used in their preparation indicated that the F:C ratio in total should be about 0.01 to about 0.5. The data in TABLE 7 show a significantly higher F:C ratio than would be expected. The results therefore indicate that there is a higher fluorine concentration near the surface of the pressed films than in the bulk of the graft copolymers.

Examples 17-18

These examples describe the graft copolymerization of a PPE monomer to polypropylene using a PPE-peroxide as a free radical initiator. The polypropylene used is the same as Example 1 and the PPE-peroxide is the same as used in Examples 15 and 16.

The PPE monomer was prepared according to the general method described in U.S. Pat. No. 4,085,137

(Mitsch et al.). The monomer was a PPE-acrylate of the general formula B $$CH_2=CHCO_2CH_2(CF_2O)_n(C_2F_4O)_mCF_2CH_2O_2CCH=CH_2 \quad (B)$$

wherein molecular weight is about 2000 and m/n is about 0.80. Graft copolymers were prepared as described in Example 15 above with a melt temperature of 230° C. PPE-peroxide was added at 1 mL/min; PPE-acrylate was added in the heated barrel section 20, 510 mm from the start of the screw at 1 mL/min (Example 17) and 2 mL/min (Example 18). The resultant copolymers were pelletized as described in Example 12.

Grafting was confirmed by extraction in tetrahydrofuran and FREON TM 113 until weight loss had stabilized. Analysis by NMR of the extract showed no trace of fluorine-containing material. A comparative example, wherein only the PPE-acrylate and no PPE-peroxide was processed along with polypropylene base polymer, showed no indication of grafting.

Films of these graft copolymers were made as in Example 1. Hexadecane contact angles were measured and ESCA analyses were carried out. Results are shown in TABLE 8.

TABLE 8

| Example | Contact Angle (°) | F:C Ratio Depth (nm) 100–250 | 400–600 | 800–900 |
|---|---|---|---|---|
| PP Control | 0 | 0 | 0 | 0 |
| 17 | 46 ± 3 | 1.2 | 0.98 | 0.76 |
| 18 | 57 ± 3 | 1.3 | 1.1 | 0.86 |
| PTFE Control | 47 | | | |

The data in TABLE 8 show that the inclusion of the PPE-acrylate in the grafting reaction results in an increase in hexadecane contact angle relative to Example 15 and 16 above, where only PPE-peroxide and no PPE acrylate was used. Also, the graft copolymers of Examples 17 and 18 have hexadecane contact angles approaching or exceeding that of the polytetrafluoroetheylene (PTFE) control sample. The ESCA results confirm the presence of fluorine in the materials and, as above, indicate that the surface of the pressed film samples has a higher fluorine concentration than the bulk of the graft copolymer.

Various modifications and alterations of this invention will become apparent to those skilled in the art without departing from the scope and spirit of this invention, and it should be understood that this invention is not to be unduly limited to the embodiments set forth herein.

We claim:

1. A fluorochemical graft copolymer comprising: a base polymer comprising polymerized units derived from monomers having terminal olefinic double bonds, having grafted thereto a plurality of polyfluoropolyether monomer units, said fluorochemical graft copolymer being prepared according to the process comprising the steps of:
   (1) feeding to a reactor in an inert atmosphere materials comprising:
      (a) a base polymer comprising polymerized units derived from monomers having terminal olefinic double bonds;
      (b) (i) at least one free radical initiator and a polyfluoropolyether monomer having a backbone comprising polyfluorooxyalkylene units, the monomer being terminated on at least one end with a functional group comprising a polymerizable double bond; and wherein all materials are substantially free of oxygen; or
      (b) (ii) a peroxidic polyfluoropolyether;
   (2) reacting the materials in the reactor to provide the fluorochemical graft copolymer; and
   (3) withdrawing the fluorochemical graft copolymer from the reactor.

2. A graft copolymer according to claim 1, comprising: a base polymer comprising polymerized units derived from monomers having terminal olefinic double bonds, having grafted thereto a plurality of polyfluoropolyether monomer units, wherein the polyfluoropolyether monomer comprises a backbone comprising polyfluorooxyalkylene units and at least one terminal polymerizable double bond.

3. A graft copolymer according to claim 2, wherein the polyfluoropolyether monomer comprises one terminal polymerizable double bond.

4. A graft copolymer according to claim 2, wherein the polyfluoropolyether monomer comprises two terminal polymerizable double bonds.

5. A graft copolymer according to claim 1, wherein the polyfluoropolyether groups are perfluoropolyether groups.

6. A graft copolymer according to claim 1, wherein the polyfluoropolyether groups have a backbone comprising at least two different perfluorooxyalkylene units selected from the group consisting of $$-CF_2O-, -CF_2CFO-, -CFO-, \text{ and } -CF_2CFO-,$$
$$\qquad\qquad\quad\;|\qquad\quad\;\;|\qquad\qquad\;\;\;|$$
$$\qquad\qquad\;\;R_1\quad\;\;OR_2\qquad\qquad OR_2$$

wherein the perfluorooxyalkylene units are randomly distributed in the backbone, and wherein
   each $R_1$ is independently fluorine or straight chain, branched chain, or cyclic perfluoroalkyl of 1 to about 10 carbon atoms,
   each $R_2$ is independently straight chain, branched chain, or cyclic perfluoroalkyl of 1 to about 10 carbon atoms, optionally substituted with one or more substituents of the formula $-(R_3O)_nR_4$ in which each $R_3$ is independently $-CF_2-$, $-CF_2CF_2-$, or $-CF_2(CF_3)CF-$, and each $R_4$ is independently straight chain, branched chain or cyclic perfluoroalkyl of 1 to about 10 carbon atoms, and n is an integer from 0 to about 6.

7. A graft copolymer according to claim 1, wherein the base polymer is selected from the group consisting of polymethyl methacrylate, poly-4-methylpentene, polypropylene, polybutylene, polystyrene, polyethylene, ethylene/vinyl acetate copolymer, ethylene butyl acrylate copolymer, and mixtures and blends thereof.

8. A graft copolymer according to claim 1, wherein the base polymer is polypropylene.

9. A graft copolymer according to claim 1, comprising: a base polymer comprising polymerized units derived from monomers having terminal olefinic double bonds, having grafted thereto a poly(perfluoroalkylene oxide) compound of the formula $$A-CF_2O(CF_2CF_2O)_m(CF_2O)_nCF_2-A'$$

where A and A' are reactive radicals containing a polymerizable double bond, and m and n designate the number of randomly distributed perfluoroethyleneoxy and perfluoromethyleneoxy backbone repeating subunits, respectively, the ratio m/n being 0.2/1 to 5/1, said compound having a number average molecular weight in the range of 500 to 20,000.

10. A graft copolymer according to claim 9, wherein the grafted compound has a number average molecular weight in the range of 800 to 15,000.

11. A graft copolymer according to claim 1, comprising: a base polymer comprising polymerized units derived from monomers having terminal olefinic double bonds, having grafted thereto a polyfluoropolyether represented by the formula

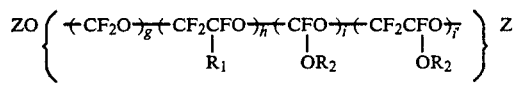

wherein
each $R_1$ is independently fluorine or straight chain, branched chain, or cyclic perfluoroalkyl of 1 to about 10 carbon atoms,
each $R_2$ is independently straight chain, branched chain, or cyclic perfluoroalkyl of 1 to about 10 carbon atoms, optionally substituted with one or more substituents of the formula $-(R_3O)_n R_4$ in which each $R_3$ is independently $-CF_2-$, $-CF_2CF_2-$, or $-CF_2(CF_3)CF-$, and each $R_4$ is independently straight chain, branched chain or cyclic perfluoroalkyl of 1 to about 10 carbon atoms, and n is an integer from 0 to about 6.
each Z is independently a polymerizable group which is or contains a polymerizable double bond;
g has a value of 1 to about 2000;
h has a value of 1 to about 2000;
the sum of i and i' has a value of 1 to about 50;
the ratio g/h is less than 5;
the ratio $(i+i')/(g+h)$ is 0.01 to 1.5;
the number average molecular weight of the polyfluoropolyether is about 650 to 20,000.

12. A graft copolymer according to claim 1 comprising about 0.1 percent to 20 percent by weight of grafted polyfluoropolyether based on the weight of the base polymer.

13. A graft copolymer according to claim 1 comprising about 0.5 percent to 15 percent by weight of grafted polyfluoropolyether based on the weight of the base polymer.

14. A graft copolymer according to claim 1, comprising: a base polymer comprising polymerized units derived from monomers having terminal olefinic double bonds, having grafted thereto a compound of the formula

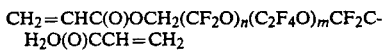

wherein the number average molecular weight of said compound is about 2000 and m/n is about 0.8.

* * * * *

UNITED STATES PATENT AND TRADEMARK OFFICE
CERTIFICATE OF CORRECTION

PATENT NO. : 5,326,823
DATED : July 5, 1994
INVENTOR(S) : Richard J. Rolando and Anthony B. Clinch It is certified that error appears in the above-indentified patent and that said Letters Patent is hereby corrected as shown below:

Col. 1, line 26      "(Else et al)" should read -- (Eise et al) --

Col. 5, lines 34-36

" 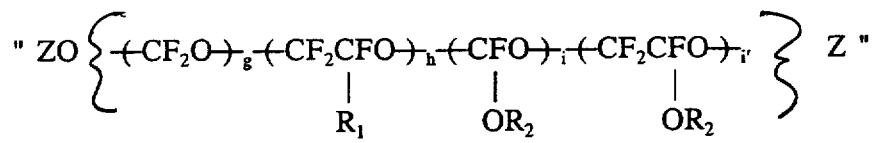

should read

-- 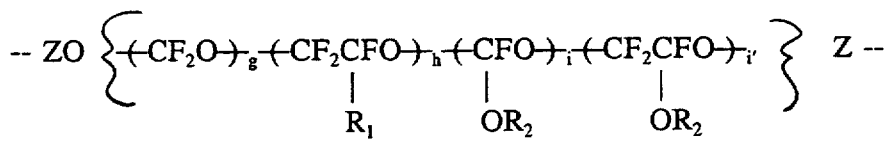

Col. 5, line 68      Delete "-$CF_2O$-,"

Col. 9, line 25      -CH-" should read -- -CF- --

Col. 9, line 35      "A˙ " should read -- $A_o$ --

Col. 9. line 58      "KPa" should read -- kPa --

Col. 10, line 52      "A˙ " should read -- $A_o$ --

Col. 11, line 13      "50°C" should read -- 250°C --

Col. 11, line 34      "an" should read -- a --

Col. 12, line 5      "A˙ " should read -- $A_o$ --

Col. 12, line 5      Insert at end of line "m/n=0.045, and mw=1602.--

UNITED STATES PATENT AND TRADEMARK OFFICE
CERTIFICATE OF CORRECTION

PATENT NO. : 5,326,823
DATED : July 5, 1994
INVENTOR(S) : Richard J. Rolando and Anthony B. Clinch It is certified that error appears in the above-indentified patent and that said Letters Patent is hereby corrected as shown below:

Col. 14, lines 2-3  Delete "and wherein all materials are substantially free of oxygen;

Col. 15, lines 15-17

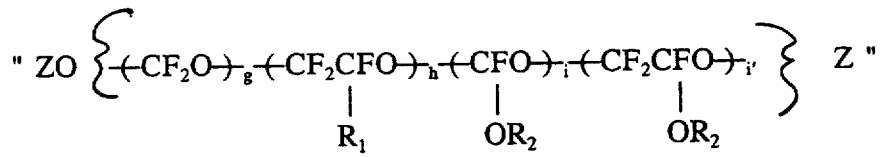

should read

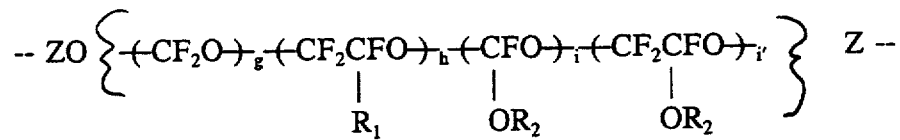

Signed and Sealed this

Twentieth Day of December, 1994

Attest:

BRUCE LEHMAN

*Attesting Officer*  *Commissioner of Patents and Trademarks*